United States Patent [19]

Simon

[11] 4,000,726
[45] Jan. 4, 1977

[54] SAFETY TANK SYSTEM
[76] Inventor: Sydney Simon, 936 Oranmore St., Pittsburgh, Pa. 15201
[22] Filed: Feb. 18, 1975
[21] Appl. No.: 550,589
[52] U.S. Cl. ............................... 123/134; 261/121
[51] Int. Cl.² ........................................ F02M 17/22
[58] Field of Search ........ 123/134; 220/88 B, 85 R, 220/85 VS, 85 S; 222/400.7, 396, 397; 261/144, 121

[56] References Cited
UNITED STATES PATENTS

| 706,454 | 8/1902 | Robinson | 123/134 |
| 2,071,116 | 2/1937 | French | 123/134 |
| 2,670,873 | 3/1954 | Whidden | 220/88 B |
| 3,395,681 | 8/1968 | Walker | 123/134 |
| 3,419,193 | 12/1968 | Steward | 222/397 |
| 3,527,391 | 9/1970 | Muria | 222/400.7 |
| 3,800,533 | 4/1974 | Zankowski | 123/134 |

FOREIGN PATENTS OR APPLICATIONS

| 524,826 | 9/1921 | France | 220/88 B |
| 811,750 | 8/1957 | United Kingdom | 220/88 B |

Primary Examiner—Ronald H. Lazarus
Attorney, Agent, or Firm—Gipple & Hale

[57] ABSTRACT

A gasoline safety tank system utilizing at least one safety tank, each safety tank comprising a tank body with interchangeable inlet and outlet fittings secured to the tank body. A conduit is connected to the inlet fitting and extending into the tank body adjacent the floor of the tank body and below the level of liquid placed in the tank. A pressurized carbon dioxide bottle is selectively connected to the inlet fitting and adapted to discharge pressurized gas into said safety tank through the conduit so that the gas bubbles up through the liquid in the tank into the top of said tank simultaneously cooling said liquid and pressurizing the liquid in said tank. The carbon dioxide bottle is adapted to be alternatively connected to the outlet fitting to pressurize the liquid and propel the liquid out of said inlet fitting and through the conduit.

2 Claims, 3 Drawing Figures

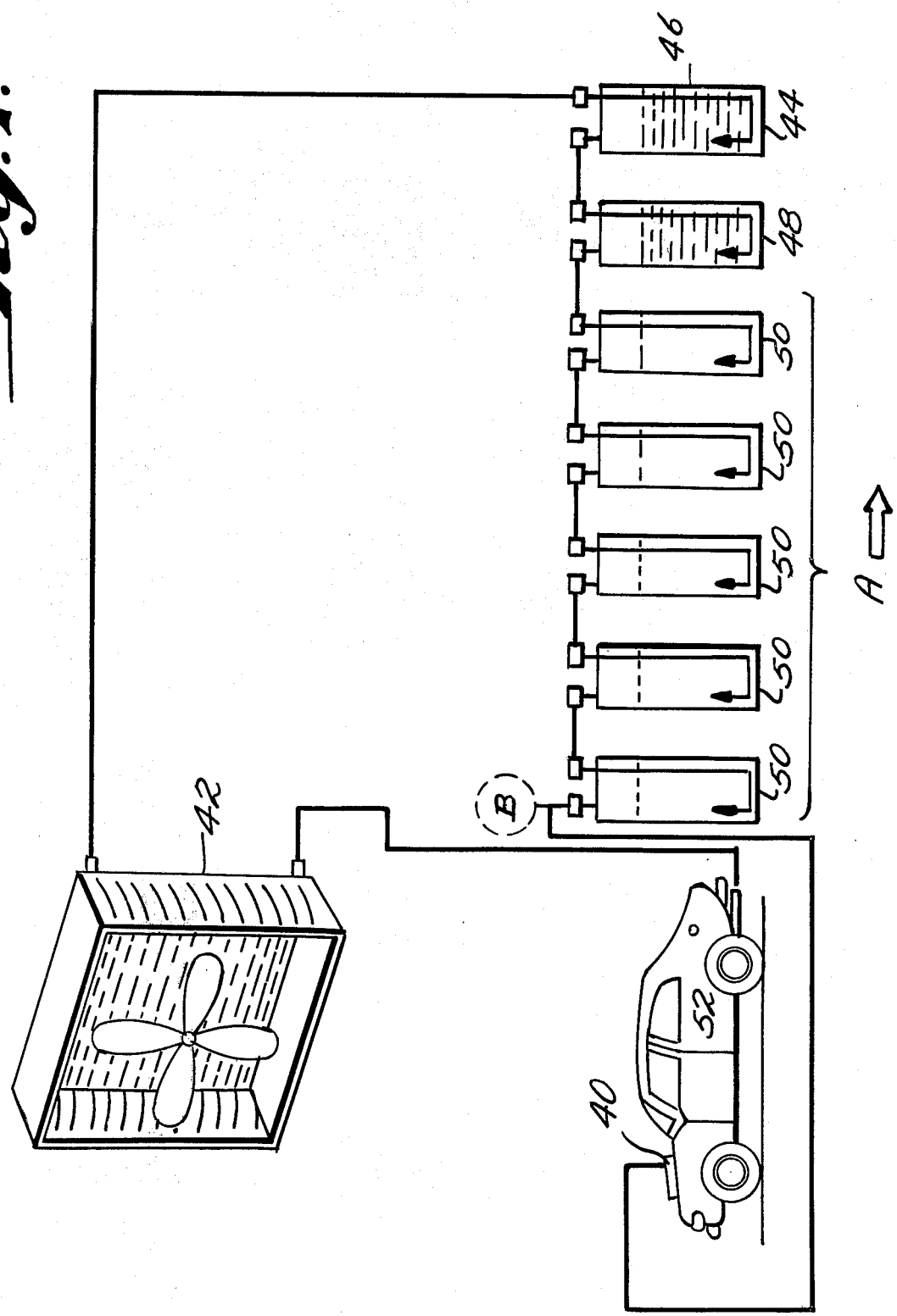

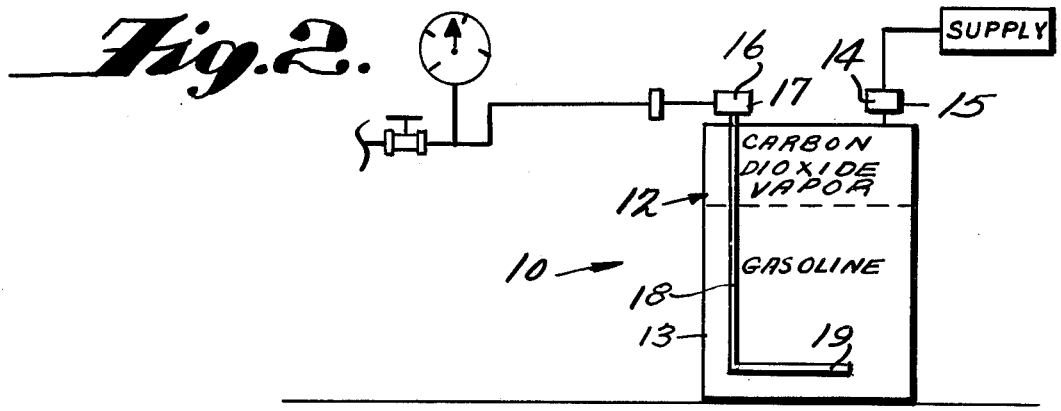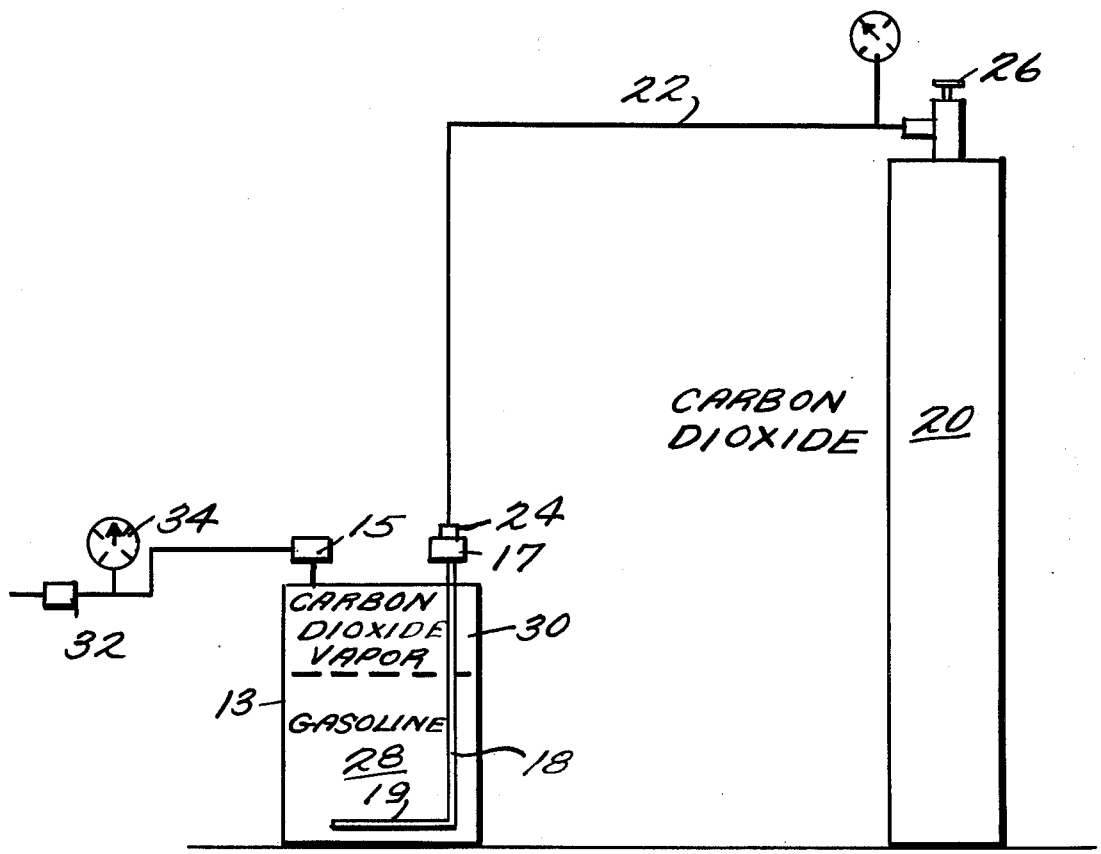

SAFETY TANK SYSTEM

The invention generally relates to containers for combustible liquids and more specifically relates to a safety storage tank which is constructed so that the explosion hazzard in the tank is eliminated with the result that the storage tank can be used in an automobile, airplane, motor boat, or other moving vehicle or simply as a storage device.

The safety storage tank is normally used for the storing of volatile fuels such as gasoline. In ordinary conditions of the storage of gasoline, air usually enters the tank as the gasoline is removed from the tank. In such conditions any partially filled tank has its upper part containing a dangerous explosive mixture of gasoline vapor and air. If a spark occurs in the upper part of the tank through an electrical discharge of static electricity or from contact with any other structure, fire and explosion will result.

The present invention eliminates the explosive hazzard by unique construction of the tank so that air is replaced in the space above the gasoline by means of an inert gas such as carbon dioxide which is heavier than air and which will not form an explosive mixture with the gasoline. The carbon dioxide is pressurized and attached to the tank so that it automatically replaces the gasoline as it is expended from the tank.

The invention is also provided with a release valve which will allow excess pressure and air from inside the tank to escape thus preventing a vacuum from forming in the tank. A pressure indicating gauge is connected to the release valve or to the tank so as to indicate to the operator or owner of the tank the current pressure in the tank.

PRIOR ART

It is known in the prior art to place an inert gas in a storage tank to prevent explosive characteristics of the tank. U.S. Pat. No. 2,153,555 discloses a tank in which the area in the space above the gasoline is replaced by an inert gas which is carbon dioxide. In this patent the gasoline is withdrawn by a pipe (not shown) and the carbon dioxide is used to fill the vacuum created in the tank by the discharged gas. A similar system is shown by U.S. Pat. No. 2,406,373 which discloses a fixed fuel vapor purging apparatus with a vapor diluting medium such as carbon dioxide under pressure. Another system is shown by U.S. Pat. No. 3,606,079 which teaches that there is a danger of an explosion in such a tank through the accumulation of static electricity built up by the incoming inert gas in the tank. This patent teaches that static electricity can build up into a spark discharge especially when gas input velocity is high and the carbon dioxide is derived from a source in liquid or solid state such as that housed in the tank of the present invention. This problem is solved by the use of a fixed emergency discharge facility which eliminates the spark discharge through the use of a complex bath expansion chamber mounted on the roof of the tank.

SUMMARY OF THE INVENTION

The present invention utilizes a specific construction so that the combination of the carbon dioxide with the gasoline and the input of carbon dioxide overcomes previous problems found in the prior art. In the present invention the carbon dioxide conduit inside the tank body extends below the surface of the liquid fuel or gasoline to cool the fuel and discharge static electricity carried by the gas before the gas contacts the vapor zone of the tank. In addition, the gas flow conduit serves as both a carbon dioxide gas flow conduit and a fuel carrying conduit depending upon its present use. When the conduit operates to carry carbon dioxide gas, the gas is bubbled up through the gasoline cooling it and keeping the fuel vapors down.

This under liquid ejection prevents the heavier carbon dioxide from forming an air lock, thus preventing one source of explosion. When the conduit operates as a fuel conduit, the carbon dioxide previously entrained in the pipe when the tank was initially pressurized operates as a safety device against leakage when attached to a quick disconnect coupling since the carbon dioxide will be expelled before the gasoline thus making it easier to determine leakage before gasoline leakage actually takes place.

The system is a portable pressurized system with the gas fuel flow line being selectively adapted to engage a gas source such as a carbon dioxide container or a fuel receiving receptacle to form an interchangeable interlocking pressure system with one or a plurality of units.

The invention will further be described with reference to the accompanying drawing, of which:

BRIEF DESCRIPTION OF THE DRAWINGS

FIG. 1 discloses a schematic utilization of one embodiment of the invention partially in perspective.

FIG. 2 shows a schematic cross-sectional view of the storage tank invention.

FIG. 3 discloses a schematic cross-sectional view of the storage tank connected with an inert gas source and gasoline receiving structure.

DETAILED DESCRIPTION OF THE DRAWINGS

In the figures a gas safety tank is disclosed in which the portable tank system 10 comprises a tank body 12 constituted by a metal or plastic wall 13 with an inlet 14 and an outlet 16. A quick disconnect coupling 15 and 17 are respectively secured to the inlet and outlet. It should be noted that while these fluid passageways are designated as inlet and outlet couplings, each can be respectively used as an inlet or an outlet opening depending upon the particular use and type of discharge which is desired from the tank. A L-shaped conduit 18 having an extension 19 extends down into the interior of the tank from inlet 16. The extension or leg is substantially parallel to the bottom of the tank to carry carbon dioxide into the tank from a gas source or can be used for transferring gasoline from the tank to another tank or structure. Gasoline or other volatile liquid can be poured into the interior of the tank by pouring it through two way valves in the quick disconnect couplings mounted to the inlet and outlet. It is also envisioned that the tank can be constructed with a removable manifold or lid upon which the couplings are mounted. One such construction would have the manifold threaded so that it would be secured into matching threads in the body of the tank.

In the preferred embodiment of the invention the gasoline is poured through coupling 15 into the interior of the tank so that the gasoline will not splash into the bottom of the tank forming undue gasoline vapors. A pressurized carbon dioxide bottle 20 is connected to the tank 10 by means of a flexible or rigid hose 22 having a quick disconnect nozzle 24 which fits into quick disconnect coupling 16 and 14 of the tank so that a gas transfer conduit is formed from the carbon dioxide tank into the gasoline safety tank. The carbon dioxide bottle 20 is adapted to cause carbon dioxide at a high or low flow rate into the tank depending upon the position of an adjustment screw 26. The tank communicates with the carbon dioxide bottle so that the cold carbon dioxide passes into the gasoline tank by going through the inlet into conduit 18 and bubbling up through the gasoline or volatile liquid 28 to the top of the tank 30.

When the carbon dioxide comes into the bottom of the tank the gas vapors rise opening a pre set pressure bleeder valve 32 in the outlet letting the excess air out so that there will be no air locks. Since the air is lighter than the carbon dioxide the air will be forced upward and out of the bleeder valve. The elimination of air locks cuts down the potential of explosions. This bubbling cools the volatile liquid and prevents the occurrance of a gasoline vapor carbon dioxide environment in the top of the tank since the cooler you get the gasoline the less vapor pressure you have. This further eliminates possible explosions when sparks discharges occur. Furthermore, the gasoline provides an effective means of discharging static electricity within the tank as the static electricity is carried from the incomming carbon dioxide discharged with the liquid. Thus there is no build up of static electricity causing a discharge spark to go into the vapor which is a highly explosive area. A gauge 34 is placed on the connection so that the pressure of the gas on the gasoline or the pressure under which the gasoline is placed, can be quickly determined. You can interlock one or any number of tanks together by flexible conduits and use all of the tanks with their own pressure. Thus a interlocking pressurized system can be formed.

Besides the embodiment shown, the tanks of FIGS. 2 and 3 can be hooked up in series of tanks so that gasoline can be passed from one tank to another without opening up any of the tanks. As is shown in FIG. 1, section A would flow being in the direction of the arrow when pressurized at position B. Thus gasoline can, for example, be passed from one ship to another or from one ship to a tank car. Furthermore volatile fuel can be passed from one train car to another without opening any of the pressurized cars so that a safe and efficient transfer is accomplished.

In another embodiment of the invention as shown in FIG. 1 carbon monoxide is fed into a series of tanks and it bubbles up through a plurality of gasoline filled tanks to provide a fuel laden vapor which passes into a carburetor 40 or other suitable device and is ignited.

After the vapor fuel has been ignited the exhaust gases which contain carbon monoxide are passed through a radiator 42 which cools the gas. A conduit 43 conducts the gases into a water filtering tank 44. The water filtering tank 44 contains water 46 to clean the carbon monoxide of carbon and associated solids and other undesirable resultant vapors. The exhaust gases bubble up through the water from the bottom of the tank, cleaning the gases while creating an oxygen vapor at the top of the tank above the water surface. A second tank 48, connected to the top of the filtering tank contains a dryer filter of cotton or other suitable composition which will take the water out of the oxygen enriched vapor which has passed from the filtration tank 44. A plurality of gasoline tanks 50 connected in series and containing gasoline communicate with the dryer tank 48. As the gas is bubbled into each successive gasoline tank, the resulting vapor mixture is enriched as each successive gasoline tank acts as a booster. When the oxygenized vapor is bubbled through the first gasoline tank 50 an insufficient gas vapor mixture, for combustion purposes, is formed at the top of the tank. The second gasoline tank 50, in series, increases the combustion quality of the fuel mixture with the third tank of the series forming the critical booster in which a gas vapor mixture of sufficient quality is formed so that an effective combustion level is reached. When the bubbling vapor gas has proceeded through the fourth tank and has reached the top of the fifth tank for entrance to the carburetor 40 or other fuel mixing system an almost 100% effective burn is achieved upon ignition in the automobile 52. Thus the five gasoline tanks generate a vapor fuel mixture of gasoline, oxygen, and vaporized hydrocarbons to give a superior combustion fuel.

If desired the cleaning and filtration process can be accomplished by utilizing standard air filtration means in tank 44. It is apparent of course, that a filter cartridge or other removable filter can be easily inserted in the tank so that a manifold containing the quick disconnect couplings can be lifted off the tank for easy replacement of the filtration system.

Thus it can be seen that many commercial uses are readily adaptable from the present invention in the transfer of volatile fluids from various areas and also in the transfer of volatile fluids for combustion.

What is claimed is:

1. An internal combustion engine of the type having fuel mixing means prior to ignition and an exhaust waste discharge means comprising conduit means secured to said exhaust waste discharge means and radiator means, said radiator means being adapted to cool waste discharge gas carried by said conduit means from said exhaust waste discharge means, a second conduit means connected to said radiator means and gas filtration means, said gas filtration means being adapted to clean gas carried by said second conduit means which was cooled by said radiator means, a plurality of fuel tanks in series connected to said filtration means and adapted to receive clean filtered gas from said filtration means, each said fuel tank comprising a body having inlet means and outlet means, a transfer conduit connected to said inlet means and extending into said tank body, an explodable liquid contained within said tank body with the level of said liquid being above one end of said transfer conduit so that gas can bubble upward into said tank to form a gaseous vapor in the top of said tank, richer in fuel composition than it was in the previous tank, said outlet means being positioned above said gasoline level in said tank, a third conduit means secured to the outlet means of the last tank of said series and connecting said outlet means with said fuel mixing means of said internal combustion engine, said internal combustion engine being adapted to ignite and explode said gaseous vapors from said fuel tank to propel moving parts of said engine.

2. Apparatus as claimed in claim 1 wherein said gas filtration means comprises a tank filled with liquid, inlet means secured to said tank and connected to said second conduit means, a discharge pipe secured to said inlet means and extending into said tank below the surface level of said liquid, outlet means secured to said tank above the surface level of said liquid, a forth conduit means connected to said outlet means and leading to a second filtration means, said second filtration means being adapted to dry gases passing therethrough from said first filtration means.

* * * * *